(12) United States Patent
Sugiyama et al.

(10) Patent No.: US 8,514,726 B2
(45) Date of Patent: Aug. 20, 2013

(54) COMPUTER PRODUCT, APPARATUS, AND METHOD FOR DEVICE TESTING

(75) Inventors: Taichi Sugiyama, Kawasaki (JP); Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 13/013,998

(22) Filed: Jan. 26, 2011

(65) Prior Publication Data

US 2011/0228684 A1 Sep. 22, 2011

(30) Foreign Application Priority Data

Mar. 19, 2010 (JP) ................................. 2010-065195

(51) Int. Cl.
*H04J 1/16* (2006.01)
(52) U.S. Cl.
USPC .......................................... 370/242; 370/252
(58) Field of Classification Search
USPC ................. 370/241, 242, 244, 250, 252, 253, 370/392
See application file for complete search history.

(56) References Cited

U.S. PATENT DOCUMENTS

| | | | |
|---|---|---|---|
| 5,761,486 A | 6/1998 | Watanabe et al. | |
| 7,120,125 B2 | 10/2006 | Kikuchi et al. | |
| 2005/0160313 A1* | 7/2005 | Wu | 714/13 |
| 2005/0256663 A1* | 11/2005 | Fujimori et al. | 702/121 |
| 2006/0224731 A1* | 10/2006 | Haga et al. | 709/224 |
| 2007/0203976 A1* | 8/2007 | Bein et al. | 709/203 |
| 2008/0163015 A1* | 7/2008 | Kagan et al. | 714/724 |
| 2008/0215696 A1* | 9/2008 | Shankar et al. | 709/206 |
| 2009/0299791 A1* | 12/2009 | Blake et al. | 709/225 |
| 2011/0090802 A1* | 4/2011 | Kotrla et al. | 370/248 |
| 2012/0163191 A1* | 6/2012 | Tokimizu et al. | 370/242 |
| 2012/0233503 A1* | 9/2012 | Ozawa et al. | 714/27 |

FOREIGN PATENT DOCUMENTS

| | | |
|---|---|---|
| JP | 09-062601 A | 3/1997 |
| JP | 2003-008648 A | 1/2003 |
| JP | 2006-148358 A | 6/2006 |

* cited by examiner

*Primary Examiner* — Andrew Lee

(74) *Attorney, Agent, or Firm* — Fujitsu Patent Center

(57) ABSTRACT

A non-transitory computer-readable recording medium storing therein a test program causing a computer to execute a process including acquiring a first packet and a second packet sent to a first device; transmitting, based on the acquired first packet, a third packet obtained by setting a destination of the first packet to a second device; and transmitting, based on the acquired second packet, a fourth packet obtained by setting a destination of the second packet to the second device, the fourth packet being transmitted upon elapse of a period from the transmission of the third packet and equal to a time interval between acquisition of the first packet and acquisition of the second packet.

13 Claims, 12 Drawing Sheets

FIG.4

| | TIME INFORMATION | | IP HEADER INFORMATION | | TCP HEADER INFORMATION | | | | | | | | | | APPLICATION HEADER INFORMATION | PAYLOAD |
|---|---|---|---|---|---|---|---|---|---|---|---|---|---|---|---|---|
| SESSION ID | TIME | RTT | SOURCE IP | DESTINATION IP | SOURCE PORT | DESTINATION PORT | SEQUENCE NUMBER | ACKNOWLEDGMENT NUMBER | SYN | ACK | PSH | FIN | RST | | |
| r1 abc | 0 | - | 10.10.10.10 | 20.20.20.20 | 2000 | 80 | 1000 | - | 1 | - | - | - | - | HTTP | ... |
| r2 abc | 0.3 | 0.3 | 20.20.20.20 | 10.10.10.10 | 80 | 2000 | 5000 | 1001 | 1 | 1 | - | - | - | - | ... |
| r3 abc | 0.4 | - | 10.10.10.10 | 20.20.20.20 | 2000 | 80 | 1001 | 5001 | - | 1 | - | - | - | - | ... |
| r4 abc | 2.1 | - | 10.10.10.10 | 20.20.20.20 | 2000 | 80 | 1001 | 5001 | - | 1 | 1 | - | - | GET | ... |
| r5 abc | 2.3 | 0.2 | 20.20.20.20 | 10.10.10.10 | 80 | 2000 | 5001 | 14001 | - | 1 | - | - | - | - | ... |
| r6 abc | 2.4 | - | 10.10.10.10 | 20.20.20.20 | 2000 | 80 | 14001 | 7001 | - | 1 | - | - | - | - | ... |
| r7 abc | 2.6 | 0.2 | 20.20.20.20 | 10.10.10.10 | 80 | 2000 | 7001 | 14001 | - | 1 | 1 | - | - | HTTP/1.0 200 OK | ... |
| ... | ... | ... | ... | ... | ... | ... | ... | ... | ... | ... | ... | ... | ... | ... | ... |
| r8 def | 0 | - | 10.10.10.10 | 20.20.20.20 | 8000 | 21 | 20000 | - | 1 | - | - | - | - | - | ... |
| r9 def | 0.5 | 0.5 | 20.20.20.20 | 10.10.10.10 | 21 | 8000 | 3000 | 20001 | 1 | 1 | - | - | - | - | ... |
| r10 def | 0.6 | - | 10.10.10.10 | 20.20.20.20 | 8000 | 21 | 20001 | 3001 | - | 1 | - | - | - | - | ... |
| ... | ... | ... | ... | ... | ... | ... | ... | ... | ... | ... | ... | ... | ... | ... | ... |

FIG.5

| SESSION ID | TIME INFORMATION | | IP HEADER INFORMATION | | TCP HEADER INFORMATION | | | | | | | | | APPLICATION HEADER INFORMATION | PAYLOAD |
|---|---|---|---|---|---|---|---|---|---|---|---|---|---|---|---|
| | TIME | RTT | SOURCE IP | DESTINATION IP | SOURCE PORT | DESTINATION PORT | SEQUENCE NUMBER | ACKNOWLEDGMENT NUMBER | SYN | ACK | PSH | FIN | RST | | |

(A)
| ... | ... | ... | ... | ... | ... | ... | ... | ... | ... | ... | ... | ... | ... | ... | ... |
| r14 | 2.1 | - | 10.10.10.10 | 20.20.20.80 | 2000 | 80 | 10001 | 11001 | - | 1 | 1 | - | - | GET | ... |

(B)
| ... | ... | ... | ... | ... | ... | ... | ... | ... | ... | ... | ... | ... | ... | ... | ... |
| r14 | 2.1 | - | 10.10.10.10 | 20.20.20.80 | 2000 | 80 | 10001 | 11001 | - | 1 | 1 | - | - | GET | ... |
| r16 | 2.4 | - | 10.10.10.10 | 20.20.20.80 | 2000 | 80 | 14001 | 13001 | - | 1 | 1 | - | - | - | ... |

(C)
| ... | ... | ... | ... | ... | ... | ... | ... | ... | ... | ... | ... | ... | ... | ... | ... |
| r14 | 2.1 | - | 10.10.10.10 | 20.20.20.80 | 2000 | 80 | 10001 | 11001 | - | 1 | 1 | - | - | GET | ... |
| r16 | 2.4 | - | 10.10.10.10 | 20.20.20.80 | 2000 | 80 | 14001 | 13001 | - | 1 | 1 | - | - | - | ... |
| r15 | 3.5 | 1.4 | 20.20.20.80 | 10.10.10.10 | 80 | 2000 | 11001 | 14001 | - | 1 | - | - | - | - | ... |

(D)
| ... | ... | ... | ... | ... | ... | ... | ... | ... | ... | ... | ... | ... | ... | ... | ... |
| r14 | 2.1 | - | 10.10.10.10 | 20.20.20.80 | 2000 | 80 | 10001 | 11001 | - | 1 | 1 | - | - | GET | ... |
| r16 | 2.4 | - | 10.10.10.10 | 20.20.20.80 | 2000 | 80 | 14001 | 13001 | - | 1 | 1 | - | - | - | ... |
| r15 | 3.5 | 1.4 | 20.20.20.80 | 10.10.10.10 | 80 | 2000 | 11001 | 14001 | - | 1 | - | - | - | - | ... |
| r17 | 3.8 | 1.4 | 20.20.20.80 | 10.10.10.10 | 80 | 2000 | 13001 | 14001 | - | 1 | 1 | - | - | HTTP/1.0 200 OK | ... |

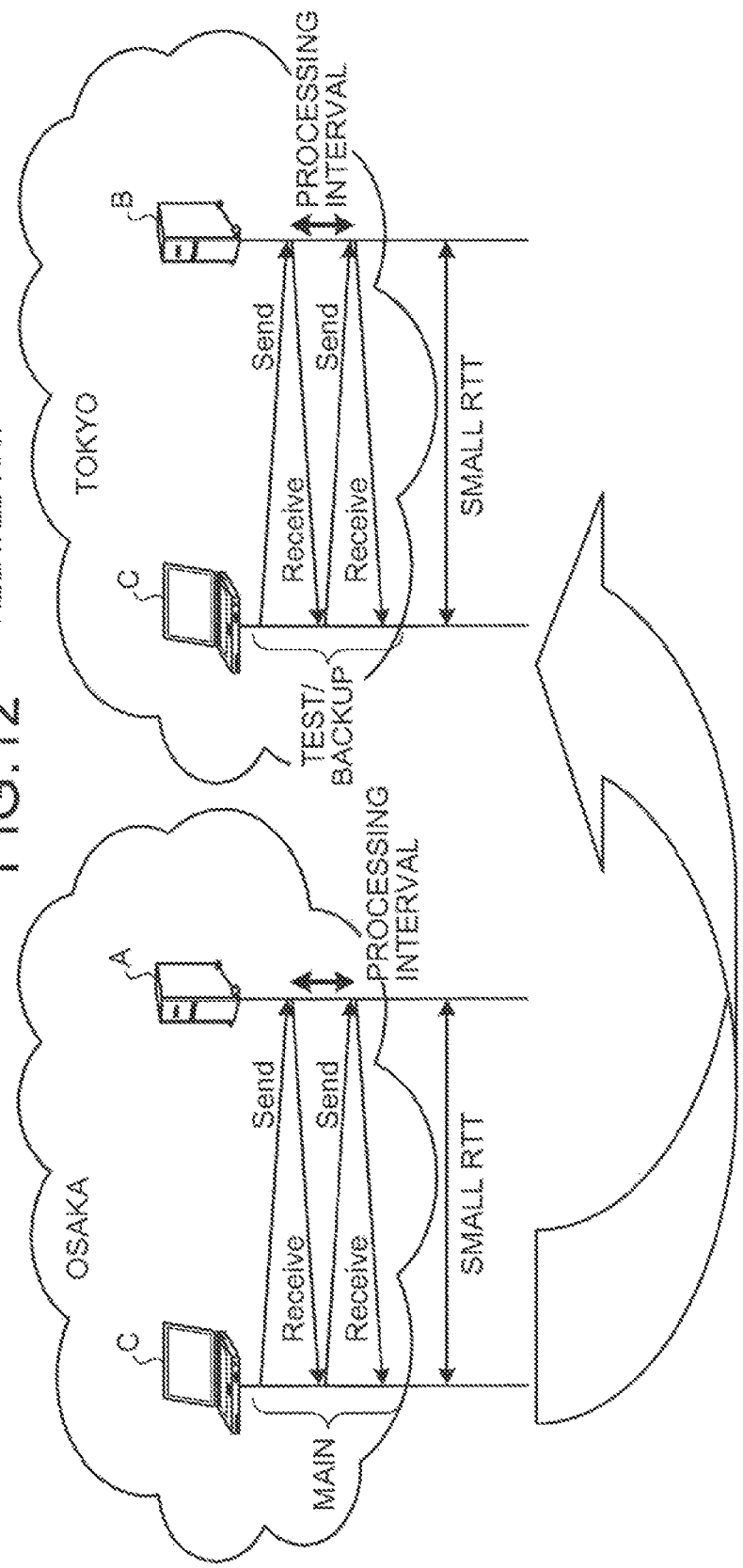

COMPUTER PRODUCT, APPARATUS, AND METHOD FOR DEVICE TESTING

CROSS REFERENCE TO RELATED APPLICATIONS

This application is based upon and claims the benefit of priority of the prior Japanese Patent Application No. 2010-065195, filed on Mar. 19, 2010, the entire contents of which are incorporated herein by reference.

FIELD

The embodiment discussed herein is related to device testing.

BACKGROUND

While technologies of evaluating performance between a client and a server have conventionally been disclosed (see, e.g., Japanese Laid-Open Patent Publication Nos. 2003-8648 and H9-62601), there is demand for performance evaluation test technology to verify a backup server quickly and accurately at the time of system transition, etc. Conventionally, with respect to such performance evaluation technology, processing such as the following is performed.

FIG. 11 is an explanatory diagram of one example of conventional relative performance evaluation processing of a main server and a backup server. FIG. 11 assumes that a main server A and a test terminal C are located in Osaka, while a backup server B is located in Tokyo. The main server A is, for example, an in-use computer currently operating in a system. The backup server B is a computer to which the main server A is scheduled to transition. In this case, in executing a test using an identical pattern (a packet and the corresponding response packet), a test conductor causes a packet captured by the test terminal C from the main server A to pass to the backup server B with the same sequence pattern as that of the main server A.

FIG. 12 is an explanatory diagram of another example of conventional relative performance evaluation processing of a main server and a backup server. FIG. 12 assumes that the main server A is located in Osaka, that the backup server B is located in Tokyo, and that the test terminal C is located in both Osaka and Tokyo. In this case, the test conductor executes packet communication between the test terminal C and the main server A in Osaka as well as packet communication between the test terminal C and the backup server B in Tokyo at a same time interval as that of the main server A, resulting in execution of the relative performance evaluation of the main server A and the backup server B.

In the example of FIG. 11, however, since the main server A and the backup server B are located in different places, the difference in round trip time (RTT) between the main server A and the backup server B (positively correlated with distance) affects the processing interval (processing load) of the main server A and the backup server B. That is to say, since the interval for transmitting and receiving the packet with respect to the backup server B is larger than that for the main server A, a problem arises in that the performance evaluation cannot be made for the same load, resulting in a drop in the quality of the performance evaluation.

On the other hand, in the example of FIG. 12, to conduct the test for the same load, the test conductor captures a packet sequence with respect to the main server A and goes to the location of the backup server B (Tokyo). Then, based on the captured data, a packet is sent out with the same sequence.

Thus, a problem arises in that the labor involved with traveling to the site, etc. increases the burden placed on the test conductor.

SUMMARY

According to an aspect of an embodiment, a non-transitory computer-readable recording medium storing therein a test program causes a computer to execute a process including acquiring a first packet and a second packet sent to a first device; transmitting, based on the acquired first packet, a third packet obtained by setting a destination of the first packet to a second device; and transmitting, based on the acquired second packet, a fourth packet obtained by setting a destination of the second packet to the second device, the fourth packet being transmitted upon elapse of a period from the transmission of the third packet and equal to a time interval between acquisition of the first packet and acquisition of the second packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram of one example of the contents of a DB.

FIG. 5 is an explanatory diagram of a packet generation example.

FIG. 12 is an explanatory diagram of another example of conventional relative performance evaluation processing of a main server and a backup server.

DESCRIPTION OF EMBODIMENTS

Preferred embodiments of the present invention will be explained with reference to the accompanying drawings.

Figure 1:
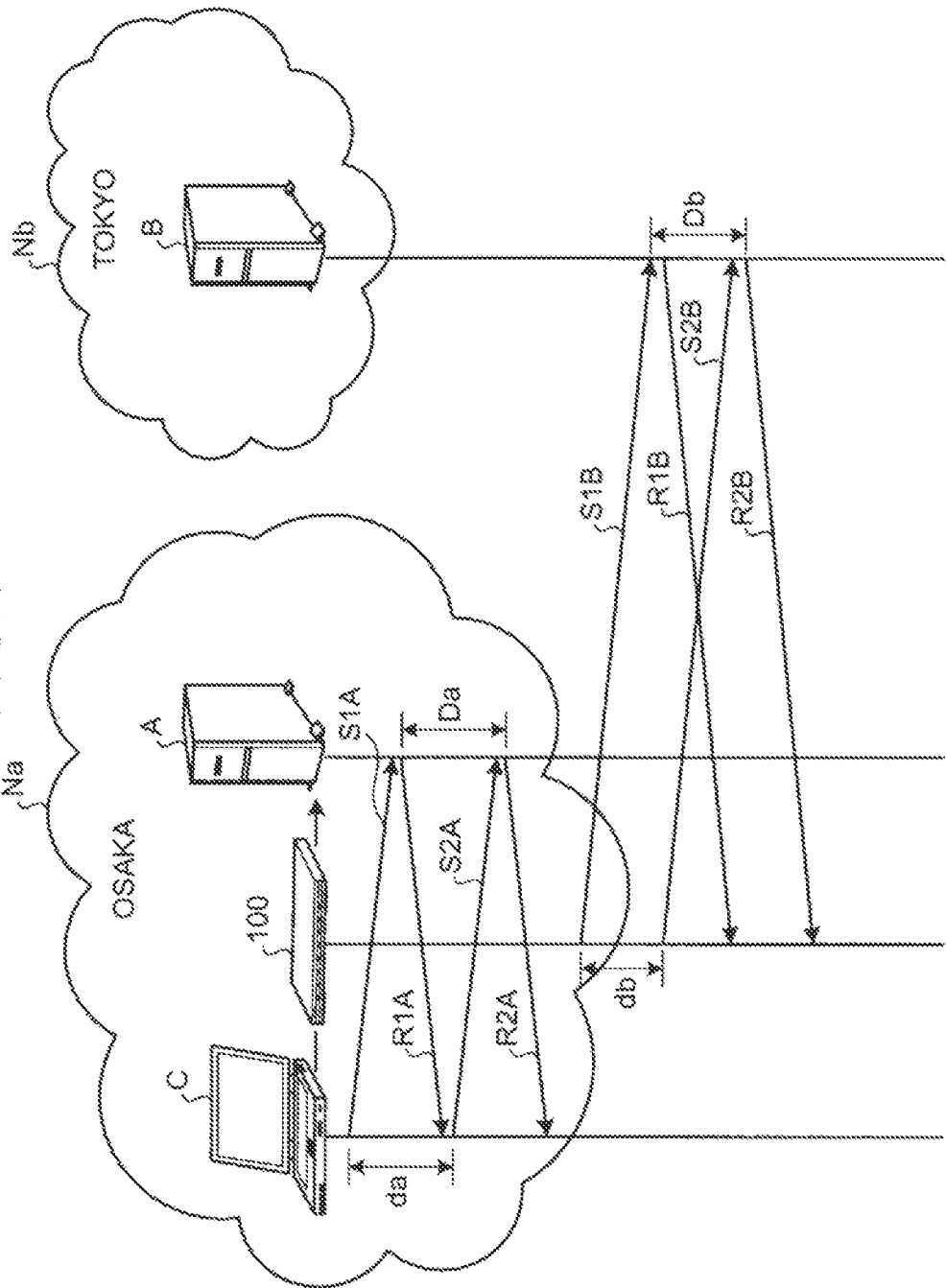
FIG. 1 is an explanatory diagram of one example of a performance evaluation test according to an embodiment.

FIG. 1 is an explanatory diagram of one example of a performance evaluation test according to an embodiment. FIG. 1 assumes that a test terminal C and a main server A, an example of a first device-under-test, are located in Osaka and that a backup server B, an example of a second device-under-test, is located in Tokyo. The locations of the servers A and B are exemplary and the servers A and B may assume other arrangement relationships. The main server A is, for example, an in-use computer currently operating in a system. The backup server B is a computer to which the main server A is scheduled to transition.

A test apparatus 100 is connected communicably to the test terminal C, the main server A, and the backup server B. For example, the test apparatus 100, the test terminal C, and the main server A are located within the same network Na and are capable of communicating with a network Nb in which the backup server B is present.

For example, consequent to the test terminal C transmitting a packet S1A to the main server A, the main server A transmits a packet R1A, as a response, to the test terminal C. Then, consequent to the test terminal C transmitting a packet S2A to the main server A, the main server A transmits a packet R2A, as a response, to the test terminal C. Here, the test apparatus 100 captures the packets S1A, S2A, R1A, and R2A.

The test apparatus 100 rewrites the destination of the captured packets S1A and S2A from the address of the main server A to the address of the backup server B, generating the packet S1A as a packet S1B and the packet S2A as a packet S2B. The test apparatus 100 then transmits the generated packets S1B and S2B to the backup server B, in the same sequence (time interval) as described above.

For example, the test apparatus 100 acquires a time interval Td between acquisition times of the packets S1A and S2A and, upon elapse of time Td after the transmission of the packet S1B, transmits the packet S2B. This enables the test apparatus 100 to send the generated packets S1B and S2B to the backup server B, in the same sequence (time interval) as described above.

The test apparatus 100 acquires time Td1, which is the time that elapses from a first reference time (e.g., a given time (test start time, etc.) set before the reception of the packet S1A) until the acquisition time of the packet S1A, and time Td2, which is the time that elapses from the first reference time until the acquisition time of the packet S2A and, upon elapse of the time Td1 from a second reference time (test start time, etc., of the backup server B), transmits the packet S1B and, upon elapse of the time Td2, transmits the packet S2B. This as well enables the test apparatus 100 to send the generated packets S1B and S2B to the backup server B, in the same sequence (time interval) as described above.

Thus, the backup server B in receipt of the packets S1B and S2B, returns packets R1B and R2B. In either case, the test apparatus 100 is allowed to send the packet S2B without waiting for reception of the packet R1B from the backup server B as a response to the packet S1B. Setting can also be made so that the destination of the response packets R1B and R2B from the backup server B will be the test apparatus 100, by making the source of the packets S1B and S2B, the address of the test apparatus 100. Setting can also be made so that the test terminal C will receive the response, with the source unchanged.

That is to say, since time interval da of the packets S1A and S2A and time interval db of the packets S1B and S2B are equivalent, processing interval Da of the packets S1A and S2A at the main server A and processing interval Db of the packets S1B and S2B at the backup server B are equivalent. Thus, the difference in the location of installation is absorbed by converting the packets S1A and S2A so that the main server A and the backup server B will undergo the performance evaluation test with the same load. Thereafter, the packets R1A and R2A from the main server A and the packets R1B and R2B from the backup server B are compared so that a relative performance evaluation can be executed for the main server A and the backup server B.

Figure 2:
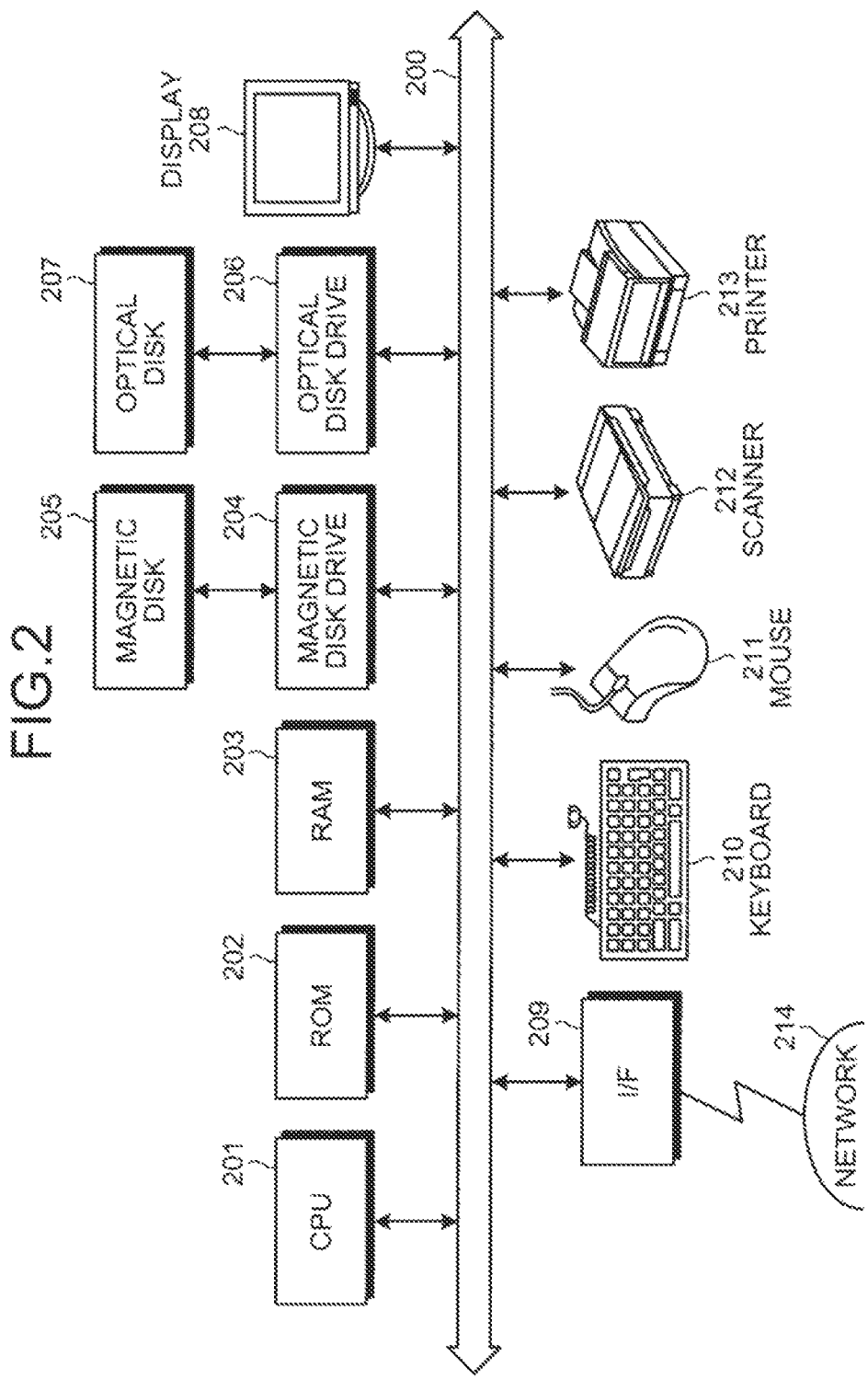
FIG. 2 is a block diagram of a hardware configuration of a computer used in the embodiment.

FIG. 2 is a block diagram of a hardware configuration of a computer (test terminal C, test apparatus 100, main server A, backup server B) used in the embodiment. As depicted in FIG. 2, the computer includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 200.

The CPU 201 governs overall control of the computer. The ROM 202 stores therein various programs such as the operating system (OS), applications, and the like. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by the computer.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 214 such as a local area network (LAN), a wide area network (WAN), and the Internet through a communication line and is connected to other apparatuses through the network 214. The I/F 209 administers an internal interface with the network 214 and controls the input/output of data from/to external apparatuses. For example, a modem or a LAN adaptor may be employed as the I/F 209.

The keyboard 210 includes, for example, keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the computer. The scanner 212 may have an optical character reader (OCR) function as well. The printer 213 prints image data and text data. The printer 213 may be, for example, a laser printer or an ink jet printer.

Figure 3:
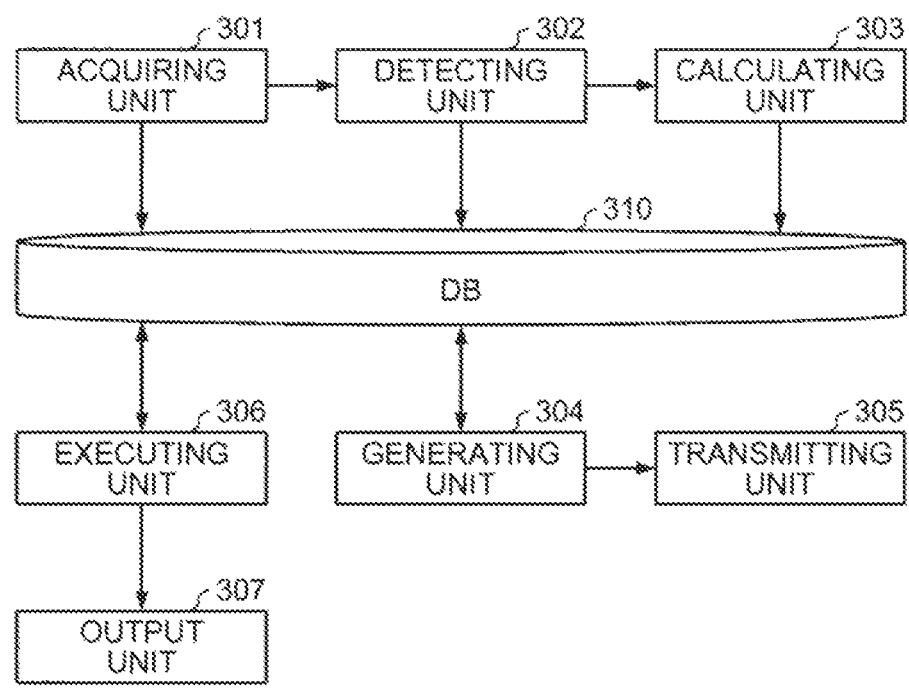
FIG. 3 is a block diagram of a functional configuration of a test apparatus.

FIG. 3 is a block diagram of a functional configuration of the test apparatus 100. The test apparatus 100 is equipped with an acquiring unit 301, a detecting unit 302, a calculating unit 303, a generating unit 304, a transmitting unit 305, an executing unit 306, an output unit 307, and database 310 (hereinafter, "DB 310").

Functions of the acquiring unit 301 to the output unit 307 are implemented by, for example, via the I/F 209 or the execution of a program by the CPU 201, the program being recorded a storage device such as the ROM 202, the RAM 203, the magnetic disk 205, and the optical disk depicted in FIG. 2. Further, for example, a function of the DB 310 is implemented by a storage device such as the ROM 202, the RAM 203, the magnetic disk 205, and the optical disk 207 depicted in FIG. 2.

The acquiring unit 301 has a function of acquiring packets. Specifically, the acquiring unit 100 captures, for example, the packets communicated between the test terminal C and the main server A and the packets communicated between the backup server B and the test terminal C. The packets acquired by the acquiring unit 301 undergo header/payload analysis and are stored to the DB 310.

The detecting unit 302 has a function of detecting the acquisition time, which is from the test start time for the device-under-test that is the destination of the acquired packet, until the time the packet is acquired. The detecting unit 302 further detects the response packet for the acquired packet, sent from the device-under-test. Specifically, for example, the detecting unit 302 uses the test start time of the device-under-test as a reference and detects, as the acquisition time, the time that elapses until the packet is received. If the acquired packet is a sync packet indicating the start of a session, the start time is not set and therefore, the acquisition time t of the sync packet is set at t=0, i.e., the test start time of the device-under-test. As to the test start time of the device-under-test, the same start time may be preset at the test terminal C and the test apparatus 100.

The calculating unit 303 has a function of calculating the time interval between the capture of a packet and the capture of a corresponding response packet. Specifically, the calculating unit 303 calculates, as the time interval, an absolute value of the difference between the acquisition time of the packet and the acquisition time of the corresponding response packet responding to the packet. The calculating unit 303 will be described in detail hereinafter. The time interval calculated by the calculating unit 303 is stored, as the RTT, to the DB 310.

The DB 310 has a function of recording information described in an acquired packet, the acquisition time detected by the detecting unit 302, and the time interval calculated by the calculating unit 303.

FIG. 4 is an explanatory diagram of one example of the contents of the DB 310. In FIG. 4, the DB 310 has a session ID column, a time information column, an internet protocol (IP) header information column, a transmission control protocol (TCP) header information column, an application header information column, and a payload column. The DB 310 stores a value in each column, for each packet. The session ID column stores session IDs. If packets are in the same session, the same session ID is stored respectively for each packet.

The time information column includes a time column and an RTT column. The time column stores the acquisition time, which is from the test start time for the device-under-test that is the destination of a given packet until the given packet is received. For packets having the same session ID, the acquisition time for the first packet captured having the session ID (sync packet) is a reference time of 0.

For example, among records r1 to r7 each having the session ID of abc, record r1 is the record for the first packet captured in the session and the reference time t=0 is stored therefor. Likewise, among records r8 to r10 having the session ID of def, record r8 is the record for the first packet captured in the session and the reference time t=0 is stored therefor.

If the captured packet is a packet from the main server A or the backup server B, the RTT is stored to the RTT column. RTT is the time interval from the capture of a packet until the capture of the corresponding response packet. The RTT is calculated by the calculating unit 303.

The IP header information column includes a source IP column and a destination IP column. The source IP column stores a source IP address described in the header of the captured packet. The destination IP column stores a destination IP address described in the header of the captured packet. In FIG. 4, the IP address of the test terminal C is given as "10.10.10.10" and the IP address of the main server A is given as "20.20.20.20". Therefore, record r1 indicates a packet from the test terminal C to the main server A and record r2 indicates the corresponding response packet.

The TCP header information column includes a source port column, a destination port column, a sequence number column, an acknowledgment number column, and flag (SYN (synchronization), ACK (acknowledgment), PSH (push), FIN (communication finish), RST (reset request)) columns. The source port column stores the source port number described in the header of the captured packet. The destination port column stores the destination port number described in the header of the captured packet.

The sequence number column stores the sequence number described in the header of the captured packet. The sequence number is a random value given by the source of the captured packet.

The acknowledgment number column stores the acknowledgment number described in the header of the captured packet. The acknowledgment number is a value given by a receiving computer, based on the sequence number of the received packet. For example, the value obtained by adding one to the sequence number of the received packet is taken as the acknowledgment number.

The flag columns each store a flag identifying the type (SYN/ACK/PSH/FIN/RST) of the packet. For example, the packet of record r1 is a SYN packet.

The application header information column stores header information, such as hypertext transfer protocol (HTTP) and post office protocol (POP)3/internet message access protocol (IMAP), related to applications.

The payload column stores the payload as data obtained by removing the header from the captured packet. The payload of the packet may be stored or may be discarded.

Communication under TCP/IP consists of a series of processes to establish a session by three-way handshake, to transfer data, and to terminate the session. In the three-way handshake, firstly, the test terminal C transmits a SYN packet (sequence number: random number on the part of the test terminal C, acknowledgment number: 0, SYN flag) as a packet to the main server A.

The main server A in receipt of the SYN packet transmits a SYN/ACK packet (sequence number: random number on the part of the main server A, acknowledgment number: SYN packet sequence number+1, SYN flag, ACK flag) to the test terminal. Then, the test terminal C in receipt of the SYN/ACK packet transmits an ACK packet (sequence number: acknowledgment number on the part of the main server A, acknowledgment number: SYN/ACK packet sequence number+1, ACK flag) as a packet to the main server A.

In the example depicted in FIG. 4, packets in records r1 to r3 and packets in records r8 to r10 are groups of packets that execute the three-way handshake.

If the packet is the first packet sent to a first device-under-test, the generating unit 304 has a function of generating a second packet by rewriting, among the information of the first packet, the destination, which is rewritten to the address of a second device-under-test.

For example, the generating unit 304 acquires, X minutes after the test start, information of packets sent during the past X minutes and rewrites the destination IP address, the destination port number, the sequence number, and the acknowledgment number. Since the sequence number and the acknowledgment number employ a random number in establishing the session, this means prior establishment of the session.

In communication under TCP/IP, since the sequence number and the acknowledgment number after session establishment by three-way handshake are determined by the length of the packet at the time of data transfer, a future value can be forecast when processing contents are known. Here, a conversion example will be described for the packets of records r4 to r7 depicted in FIG. 4.

Record r4 indicates a packet with an acknowledgment number of 5001 sent from the test terminal C to the main server A, 2.1 seconds after the start of communication. Record r6 indicates a packet with an acknowledgment number of 7001 sent from the test terminal C to the main server A, 2.4 seconds after the start of communication, as a result of the packet of record r4 sent to the main server A.

FIG. 5 is an explanatory diagram of a packet generation example. In FIG. 5 the order of (A) to (D) expresses a chronological order. As step (A) of FIG. 5, record r14 is a record for a packet (second packet) generated from the packet (first packet) in record r4 depicted in FIG. 4. The generating unit 304 rewrites the session ID from "abc" to "ijk" to send the second packet after conversion to the backup server B.

The generating unit 304 rewrites the destination IP address of the packet in record r4 sent to the main server A to the IP address: 20.20.20.80 of the backup server B. Further, the generating unit 304 adds a preliminarily determined variation: 6000 to the acknowledgment number: 5001, rewriting the acknowledgment number to: 11001. The generating unit 304 leaves the acquisition time of 2.1 seconds as it is, setting it as the acquisition time from the test start time of the second device-under-test (server B) until the acquisition of the second packet. The generated record is given as r14.

At step (B) of FIG. 5, record r16 is a record for a packet (second packet) generated from the packet (first packet) in record r6 depicted in FIG. 4. The generating unit 304 rewrites the session ID from "abc" to "ijk" to send the second packet after conversion to the backup server B.

The generating unit 304 rewrites the destination IP address of the packet (in record r6) sent to the main server A to the IP address: 20.20.20.80 of backup server B. Further, the generating unit 304 adds a preliminarily determined variation: 6000 to the acknowledgment number: 7001, rewriting the acknowledgment number to: 13001. The generating unit 304 leaves the acquisition time of 2.4 seconds as is, setting 2.4 as the acquisition time from the test start time of the second device-under-test (server B) until the acquisition of the second packet. The converted record is given as r16.

In FIG. 3, the transmitting unit 305 has a function of transmitting the second packet generated by the generating unit 304 to the second device-under-test when the acquisition time, which is from the test start of the second device-under-test until the acquisition of the first packet, has elapsed. For example, at steps (A) and (B) of FIG. 5, the transmitting unit 305 transmits the second packets to the backup server B (the destination after generation), according to the acquisition time in records r14 and r16 for the second packets. Specifically, the transmitting unit 305 transmits the packet in record r14 to the backup server B 2.1 seconds after the test start and the packet in record r16 to the backup server B 2.4 seconds after the test start.

When the packet in record r14 is sent to the backup server B, the backup server B transmits a response packet to the test terminal C. The acquiring unit 301 captures this response packet and stores it to the DB 310, as record r15 at step (C). Since the acquisition time until this capture is 3.5 seconds after the test start time of the backup server B, "3.5" is stored to the time column of record r15. The calculating unit 303 calculates 1.4 seconds (=3.5−2.1) as the RTT.

Similarly, when the packet in record r16 is sent to the backup server B, the backup server B transmits a response packet to the test terminal C. The acquiring unit 301 captures this response packet and stores it to the DB 310, as record r17 at step (C). Since the acquisition time until this capture is 3.8 seconds after the test start of the backup server B, "3.8" is stored to the time column of record r17. The calculating unit 303 calculates 1.4 seconds (=3.8−2.4) as the RTT.

Figure 6:
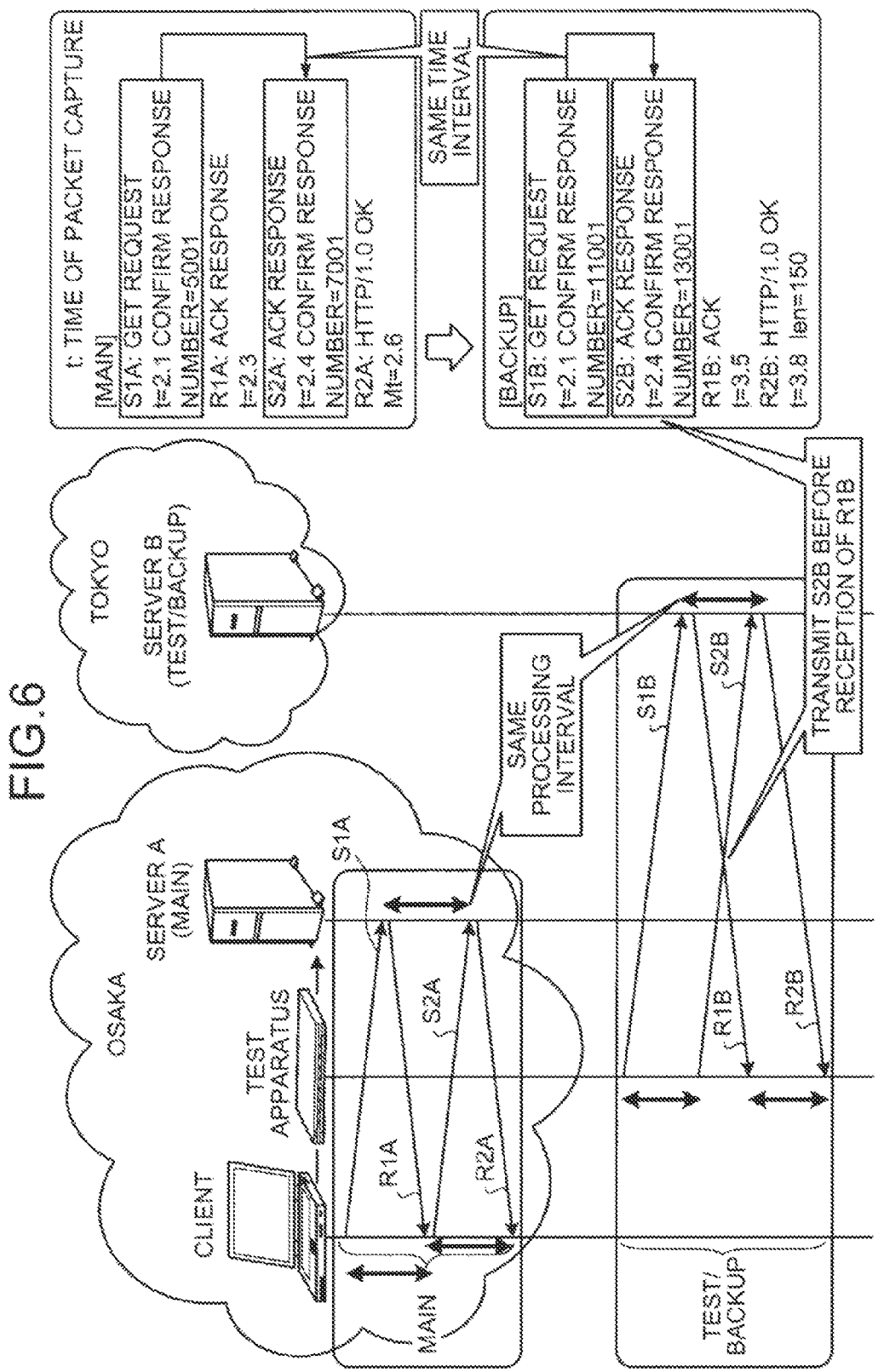
FIG. 6 is an explanatory diagram of results of transmitting second packets.

FIG. 6 is an explanatory diagram of results of transmitting the second packets. The packet in record r4 is the packet S1A, the packet in record r5 is the packet R1A, the packet in record r6 is the packet S2A, and the packet in record r7 is the packet R2A.

The packet in record r14 depicted in FIG. 5 is the packet S1B, the packet in record r15 is the packet R1B, the packet in record r16 is the packet S2B, and the packet in record r17 is the packet R2B.

As depicted in FIG. 6, the transmission of the packet S2B to the backup server B is executed prior to the reception of the packet R1B from the backup server B. Therefore, the time interval between the packets S1A and S2A sent to the main server A and the time interval between the packets S1B and S2B sent to the backup server B become equivalent.

Thus, in communication under TCP/IP, the header information is appropriately rewritten so that the main server A can continue transmitting the packets without waiting for the response from the remotely located backup server B. This causes the backup server B to execute the same processing at the same timing as the main server A, enabling the same load test as given to the main server A to be reproduced at the backup server B.

In FIG. 3, the calculating unit 303 calculates the RTT as the time interval. For example, the calculating unit 303 captures the first packet sent from the test terminal C to a first device-under-test and the third packet as the corresponding response packet sent from the first device-under-test to the test terminal C. The calculating unit 303 calculates a first time interval by subtracting the acquisition time (from the test start of the first device-under-test until the acquisition of the first packet) from the acquisition time (from the test start of the first device-under-test until the acquisition of the third packet).

For example, in FIG. 6, the first time interval da=0.2 is calculated as the RTT by subtracting the acquisition time t=2.1 (the time from the test start of the main server A until the acquisition of the packet S1A, i.e., first packet) from the acquisition time t=2.3 (the time from the test start of the main server A until the acquisition of the packet R1A, i.e., third packet). Therefore, in FIG. 4, "0.2" is stored to the RTT column of record r5 for the packet R1A.

Likewise, the first time interval is calculated between the packet R2A and the packet S2A. Specifically, in FIG. 6, the first time interval da=0.2 is calculated as the RTT by subtracting the acquisition time t=2.4 (the time from the test start of the main server A until the acquisition of the packet S2A, i.e., first packet) from the acquisition time t=2.6 (the time from the test start of the main server A until the acquisition of the packet R2A, i.e., third packet). Therefore, in FIG. 4, "0.2" is stored to the RTT column of record r7 for the packet R2A.

The calculating unit 303 captures a second packet sent from the test terminal C to a second device-under-test and a fourth packet as the corresponding response packet sent from the second device-under-test to the test apparatus 100. The calculating unit 303 calculates the second time interval by subtracting the acquisition time (from the test start of the second device-under-test until the acquisition of the second packet) from the acquisition time (from the test start of the second device-under-test until the acquisition of the fourth packet).

For example, in FIG. 6, the second time interval da=1.4 is calculated as the RTT by subtracting the acquisition time t=2.1 (the time from the test start of the backup server B until the acquisition of the packet S1B, i.e., second packet) from the acquisition time t=3.5 (the time from the test start of the backup server B until the acquisition of the packet R1B, i.e., fourth packet). Therefore, in FIG. 5, "1.4" is stored to the RTT of record r15 for the packet R1B.

Likewise, the second time interval is calculated between the packet R2B and the packet S2B. Specifically, in FIG. 6, the second time interval db=1.4 is calculated as the RTT by subtracting the acquisition time t=2.4 (the time from the test start of the backup server B until the acquisition of the packet S2B, i.e., second packet) from the acquisition time t=3.8 (the time from the test start of the backup server B until the acquisition of the packet R2B, i.e., fourth packet). Therefore, in FIG. 5, "1.4" is stored to the RTT of record r17 for the packet R2B.

The executing unit 306 has a function of executing relative performance evaluation processing of the first and the second devices-under-test. For example, the executing unit 306 executes the relative performance evaluation processing of the first and the second devices-under-test, based on the first time interval da, the second time interval db, and a third time interval dc. Here, the third time interval dc is the RTT from the transmission of the packet from the first device-under-test to the second device-under-test until reception by the first device-under-test of a corresponding response packet from the second device-under-test. The third time interval dc is pre-measured and pre-stored in the DB 310. This enables the third time interval dc to be read out from the DB 310 at the time of execution by the executing unit 306.

The executing unit 306, using the first to the third time intervals da to dc, executes the relative performance evaluation processing of the first and the second devices-under-test as follows. For example, the executing unit 306 compares, in terms of magnitude, results of subtracting the second time interval db from the third time interval dc and the first time interval da.

If da>dc−db is true, it is determined that the backup server B as the second device-under-test has higher performance than that of the main server A as the first device-under-test.

If da<dc−db is true, it is determined that the main server A as the first device-under-test has higher performance than that of the backup server B as the second device-under-test.

If da=dc−db is true, it is determined that the main server A as the first device-under-test and the backup server B as the second device-under-test have the same performance.

The output unit 307 has a function of outputting results obtained by the executing unit 306. Specifically, for example, the output unit 307 displays on a display or prints out results of the relative performance evaluation of the first and the second devices-under-test executed by the executing unit 306.

A test procedure will be described of the test apparatus 100 according to the embodiment with reference to FIGS. 7 to 9.

Figure 7:
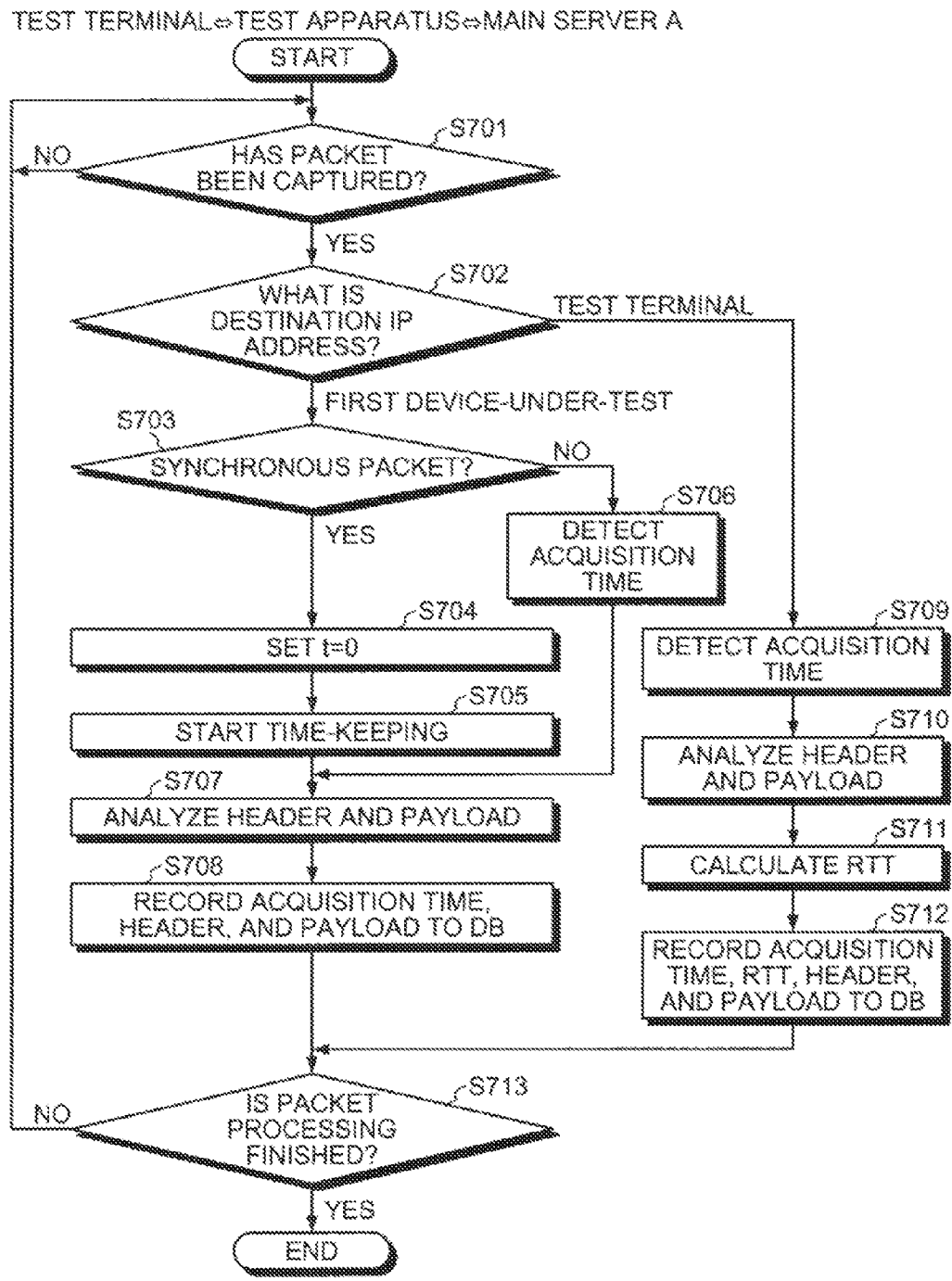
FIG. 7 is a flowchart of a packet capture procedure of the test apparatus according to the embodiment.

FIG. 7 is a flowchart of a packet capture procedure of the test apparatus 100 according to the embodiment. Firstly, the test apparatus 100 waits until a packet is captured by the acquiring unit 301 (step S701: NO). When a packet is captured (step S701: YES), the test apparatus 100 checks the destination IP address described in the header of the captured packet (step S702).

If the destination IP address is the IP address of the first device-under-test (step S702: first device-under-test), the test apparatus 100 checks whether the captured packet is a sync packet (step S703). If the captured packet is the sync packet (step S703: YES), the test apparatus 100 sets t=0 as the elapsed time from the test start of the first device-under-test (step S704) and starts time-keeping (step S705), and the flow proceeds to step S707.

On the other hand, if it is determined at step S703 that the captured packet is not the sync packet (step S703: NO), since the time-keeping has already been started at step S705, the test apparatus 100 detects the acquisition time from the test start of the first device-under-test until the time of the capture of the packet (first packet) (step S706), and the flow proceeds to step S707.

At step S707, the test apparatus 100 analyzes the header and the payload of the captured packet (step S707) and records the acquisition time, the header, and the payload to the DB 310 (step S708), and the flow proceeds to step S713.

If it is determined at step S702 that the destination IP address is the IP address of the test terminal C (step S702: test terminal C), since the time-keeping has already been started at step S705, the test apparatus 100 detects the acquisition time from the test start of the first device-under-test until the time of the capture of the packet (third packet) (step S709).

The test apparatus 100 analyzes the header and the payload of the captured packet (step S710) and calculates the RTT by subtracting from the acquisition time of the third packet, the acquisition time of the corresponding first packet (step S711). Thereafter, the test apparatus 100 records the acquisition time, the RTT, the header, and the payload to the DB 310 (step S712) and proceeds to step S713.

At step S713, the test apparatus 100 determines whether the packet processing is finished (step S713). For example, the test apparatus 100 determines whether the packet captured this time is a FIN packet. If the packet processing is not finished (step S713: NO), the flow returns to step S701. On the other hand, if the packet processing is finished (step S713: YES), the packet capture processing is ended. Thus, the first and the third packets are stored to the DB 310 depicted in FIG. 4.

Figure 8:
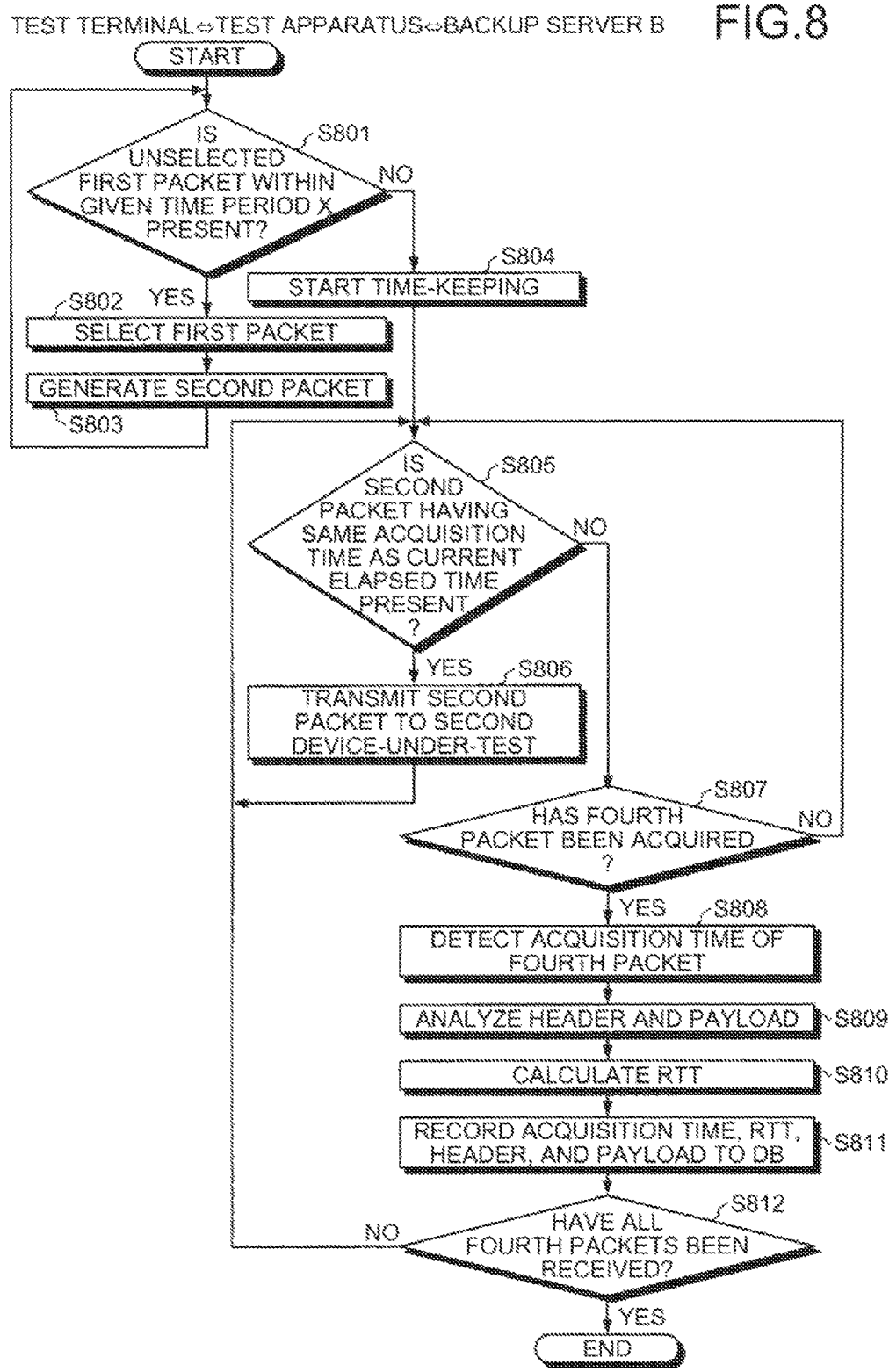
FIG. 8 is a flowchart of a packet exchange/transmitting procedure by the test apparatus according to the embodiment.

FIG. 8 is a flowchart of a packet exchange/transmitting procedure by the test apparatus 100 according to the embodiment. Firstly, the test apparatus 100 determines whether there is (a record of) a first packet that within a given time period X, remains unselected in the DB 310 (step S801). If there an unselected first packet remains (step S801: YES), the test apparatus 100 selects the unselected first packet (step S802). The test apparatus 100, using the generating unit 304, generates the selected first packet as a second packet and stores the generated second packet to the DB 310 (step S803), and returns to step S801.

On the other hand, at step S801, if there is no first packet remains unselected (step S801: NO), then the test apparatus 100 starts the time-keeping (step S804) and determines whether there is a second packet having the same acquisition time as the elapsed time from the start of the time-keeping (test start of second device-under-test) (step S805). If there is a second packet having the same acquisition time (step S805: YES), the test apparatus 100 transmits the corresponding second packet to the second device-under-test (step S806) and returns to step S805.

On the other hand, at step S805, if there is no second packet having the same acquisition time as the elapsed time up to the present time (step S805: NO), the test apparatus 100 determines whether a fourth packet has been captured (step S807). If no fourth packet has been captured (step S807: NO), the test apparatus 100 returns to step S805.

On the other hand, if a fourth packet has been captured (step S807: YES), then the test apparatus 100 detects the acquisition time from the test start of the second deviceunder-test until the time of the capture of the packet (fourth packet) (step S808). The test apparatus 100 executes the header and payload analysis (step S809) and calculates the RTT by subtracting from the acquisition time of the fourth packet, the acquisition time of the corresponding second packet (step S810).

The test apparatus 100 then records the acquisition time, the RTT, the header, and the payload to the DB 310 (step S811) and determines whether all of the fourth packets have been received (step S812). For example, determination is made based on whether the RTT has been calculated using the corresponding second packets.

If all of the fourth packets have not been received (step S812: NO), then the flow returns to step S805. On the other hand, if all of the fourth packets have been received (step S812: YES), the packet exchange/transmitting processing is ended. Thus, the second and the fourth packets are stored to the DB 310 as depicted in FIG. 5.

Figure 9:
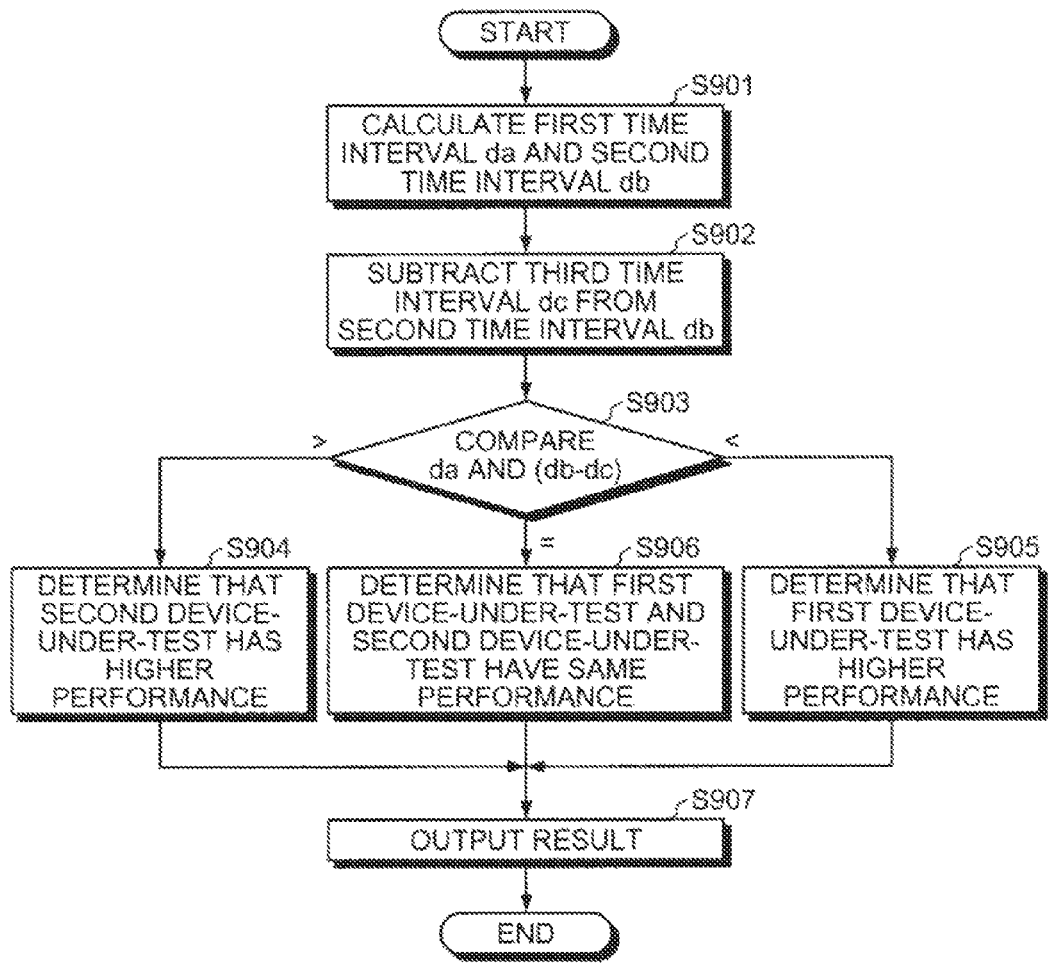
FIG. 9 is a flowchart of a relative performance evaluation procedure of first and second devices-under-test.

FIG. 9 is a flowchart of a relative performance evaluation procedure of the first and the second devices-under-test. Firstly, the test apparatus 100 calculates the first time interval da and the second time interval db (step S901) and subtracts the third time interval dc from the second time interval db (step S902). The test apparatus 100 then compares the first time interval da and the result of the subtraction (db−dc) (step S903).

If da>db−dc is true (step S903:>), the test apparatus 100 determines that the second device-under-test has higher performance (step S904), and proceeds to step S907. If da<db−dc is true (step S903:<), the test apparatus 100 determines that the first device-under-test has higher performance (step S905), and proceeds to step S907.

Further, if da=db−dc (step S903: =), then the test apparatus 100 determines that the first device-under-test and the second device-under-test have the same performance (step S906), and proceeds to step S907. At step S907, the test apparatus 100 outputs results of the determination at steps S904 to S906 (step S907). This makes it possible to make the access interval equal between the first device-under-test and the second device-under-test and to implement a reproduction test equalizing the loads of devices-under-test.

Since the difference in the RTT between the first device-under-test and the second device-under-test is negligible, shortening of the test time can be achieved. Thus, the performance evaluation of the devices-under-test can be executed quickly and accurately.

While in the embodiment described above the performance evaluation has been executed using the first time interval da, the second time interval db, and the third time interval dc, the performance evaluation described above cannot be executed when the third time interval dc has not been measured or cannot be measured. In such a case, the performance evaluation may be executed by calculating for the third packet from the first device-under-test, a first reception interval det1 at the test apparatus 100 and for the fourth packet from the second device-under-test, a second reception interval det2 at the test apparatus 100.

For example, with reference to FIG. 6, the calculating unit 303 calculates the difference between the acquisition time of the packet R2A and the acquisition time of the packet R1A as the first reception interval det1. Likewise, the calculating unit 303 calculates the difference between the acquisition time of the packet R2B and the acquisition time of the packet R1B as the second reception interval det2.

The executing unit 306 executes the relative performance evaluation processing of the first and the second devices-under-test as follows by comparing in terms of magnitude the first reception interval det1 and the second reception interval det2.

If det1>det2 is true, it is determined that the backup server B as the second device-under-test has higher performance than that of the main server A as the first device-under-test.

If det1<det2 is true, it is determined that the main server A as the first device-under-test has higher performance than that of the backup server B as the second device-under-test.

If det1=det2 is true, it is determined that the main server A as the first device-under-test and the backup server B as the second device-under-test have the same performance. Thus, in this manner, even if there is no third time interval dc, performance evaluation can be executed.

Figure 10:
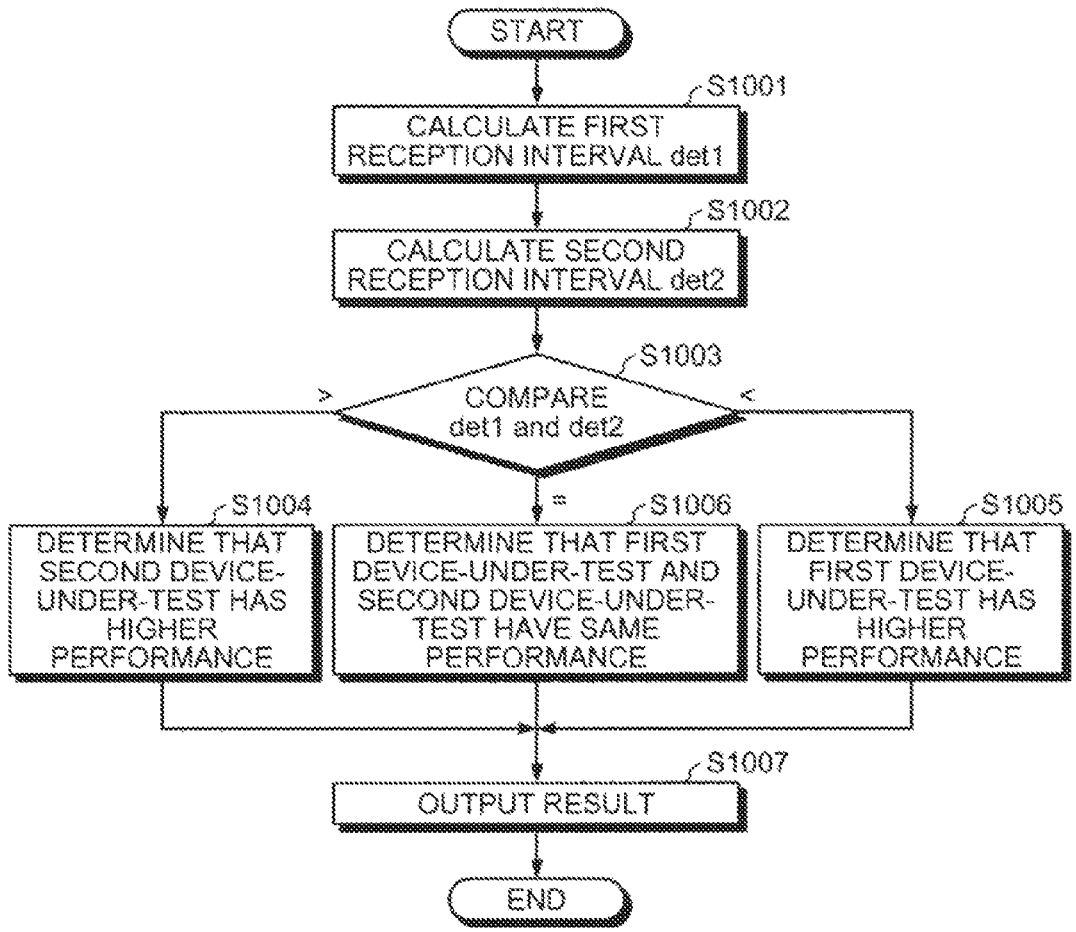
FIG. 10 is a flowchart of a relative performance evaluation procedure of the first and the second devices-under-test.
Figure 11:
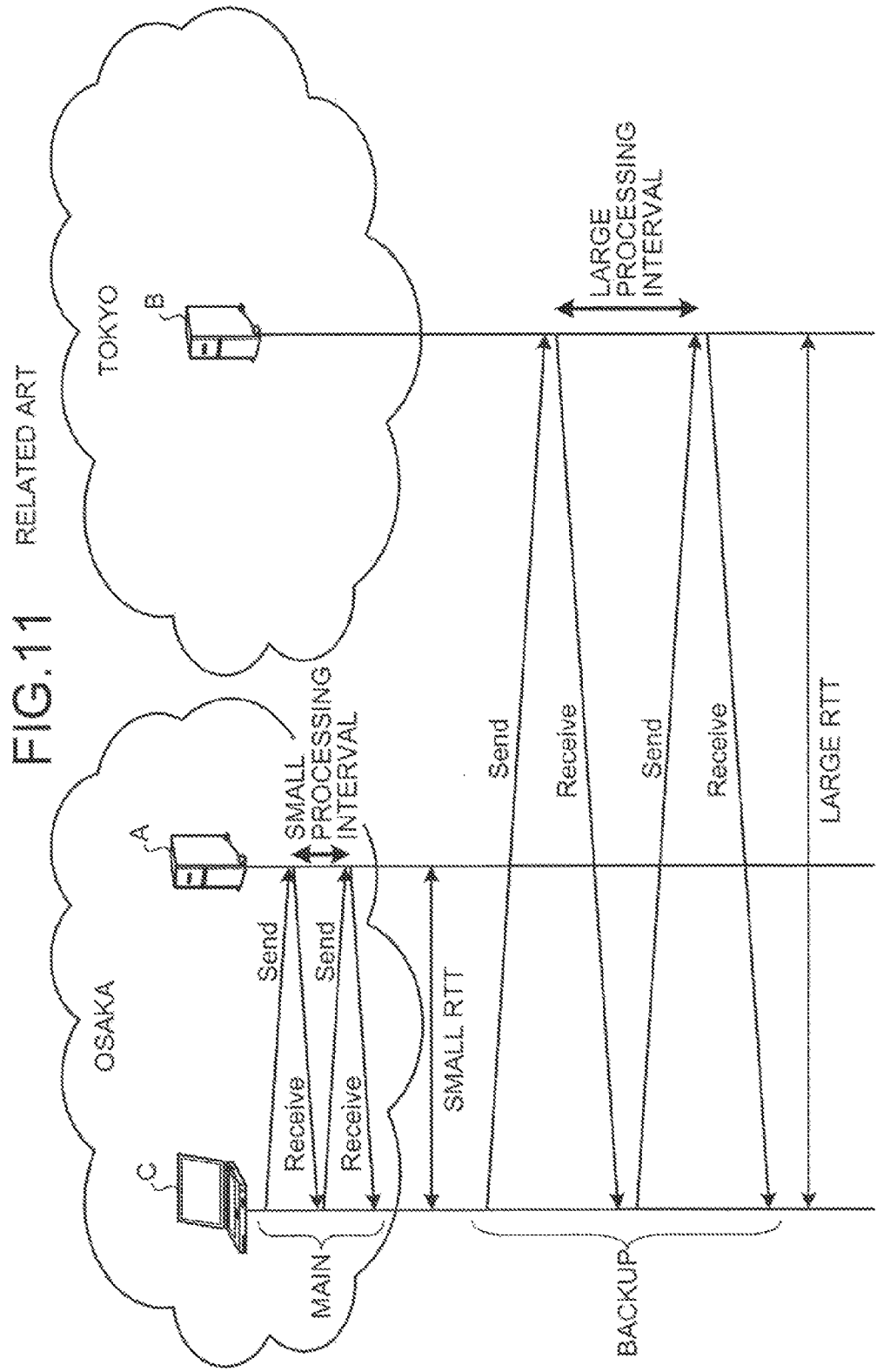
FIG. 11 is an explanatory diagram of one example of conventional relative performance evaluation processing of a main server and a backup server.

FIG. 10 is a flowchart of a relative performance evaluation procedure of the first and the second devices-under-test. Firstly, the test apparatus 100 calculates the first reception interval det1 (step S1001) and the second reception interval det2 (step S1002). The test apparatus 100 then compares the first reception interval det1 and the second reception interval det2 (step S1003).

If det1>det2 is true (step S1003:>), the test apparatus 100 determines that the second device-under-test has higher performance (step S1004), and proceeds to step S1007. If det1<det2 is true (step S1003:<), the test apparatus 100 determines that the first device-under-test has higher performance (step S1005), and proceeds to step S1007.

Further, if det1=det2 (step 51003: =), then the test apparatus 100 determines that the first device-under-test and the second device-under-test have the same performance (step S1006), and proceeds to step S1007. At step S1007, the test apparatus 100 outputs results of the determination at steps S1004 to S1006 (step S1007). This makes it possible to make the access interval equal between the first device-under-test and the second device-under-test and to implement a reproduction test equalizing the loads of devices-under-test.

Since the difference in the RTT between the first device-under-test and the second device-under-test is negligible, shortening of the test time can be achieved. Thus, the performance evaluation of the devices-under-test can be executed quickly and accurately.

As described, according to the embodiment, the destination of a packet to the first device-under-test is changed to the second device-under-test and is sent to the second device-under-test at the same time as that of the transmission to the first device-under-test. Therefore, by making the second device-under-test seems as if located within the same communication distance as that of the first device-under-test, the reproduction test can be executed with the same load.

The execution of the performance evaluation using the first time interval da, the second time interval db, and the third time interval dc makes it possible to make the access interval equal between the first device-under-test and the second device-under-test and to execute the reproduction test equalizing the loads of the devices-under-test.

Since the difference in the RTT between the first device-under-test and the second device-under-test is negligible, shortening of the test time can be achieved. Thus, the performance evaluation of the devices-under-test can be executed quickly and accurately.

Furthermore, the performance evaluation can be executed even in the absence of the third time interval dc by executing the performance evaluation using the first reception interval det1 and the second reception interval det2.

The test method described in the present embodiment may be implemented by executing a prepared program on a computer such as a personal computer and a workstation. The program is stored on a non-transitory computer-readable recording medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein a test program causing a computer to execute a process comprising:
   acquiring a first packet and a second packet sent to a first device;
   transmitting, based on the acquired first packet, a third packet obtained by setting a destination of the first packet to a second device; and
   transmitting, based on the acquired second packet, a fourth packet obtained by setting a destination of the second packet to the second device, the fourth packet being transmitted upon elapse of a period from the transmission of the third packet and equal to a time interval between acquisition of the first packet and acquisition of the second packet.

2. The computer-readable, non-transitory medium according to claim 1, the process further comprising
   setting a source of the third packet and a source of the fourth packet.

3. The computer-readable, non-transitory medium according to claim 1, wherein
   the first packet and the second packet correspond to consecutive packets sent to the first device from a given device.

4. The non-transitory computer-readable recording medium according to claim 1, the process further comprising
   acquiring a first period corresponding to time elapsing from a first reference time until time of acquisition of the first packet and a second period corresponding to time elapsing from the first reference time until time of acquisition of the second packet, wherein
   the third packet is transmitted upon elapse of a period from a second reference time and corresponding to the first period, and
   the fourth packet is transmitted upon elapse of a period from the second reference time and corresponding to the second period.

5. The computer-readable, non-transitory medium according to claim 1, the process further comprising:
   executing relative performance evaluation processing of the first and the second devices, based on a first time interval from the acquisition of the first packet until acquisition of the third packet, a second time interval from the acquisition of the second packet until acquisition of the fourth packet, and a third time interval measured by transmission and reception between the first device and the second device.

6. The computer-readable, non-transitory medium according to claim 5, the process further comprising:
   determining that the second device has higher performance than that of the first device, if the first time interval is greater than a result obtained by subtracting the second time interval from the third time interval; and
   outputting a result obtained at the determining.

7. The computer-readable, non-transitory medium according to claim 5, the process further comprising:
   determining that the first device has higher performance than that of the second device, if the first time interval is less than a result obtained by subtracting the second time interval from the third time interval; and
   outputting a result obtained at the determining.

8. The computer-readable, non-transitory medium according to claim 5, the process further comprising:
   determining that the first device and the second device have equivalent performance, if the first time interval is equal to a result obtained by subtracting the second time interval from the third time interval; and
   outputting a result obtained at the determining.

9. The computer-readable, non-transitory medium according to claim 1, the process further comprising:
   calculating a first reception time interval of receiving the third packet from the first device;
   calculating a second reception time interval of receiving the fourth packet from the second device;
   executing relative performance evaluation processing of the first and the second devices, based on the first and the second reception time intervals; and
   outputting a result obtained at the executing.

10. The computer-readable, non-transitory medium according to claim 9, the process further comprising:
    determining that the second device has higher performance than that of the first device, if the first reception time interval is greater than the second reception time interval; and
    outputting a result obtained at the determining.

11. The computer-readable, non-transitory medium according to claim 9, the process further comprising:
    determining that the first device has higher performance than that of the second device, if the first reception time interval is less than the second reception time interval; and
    outputting a result obtained at the determining.

12. A test apparatus comprising:
    an acquiring unit that acquires a first packet and a second packet sent to a first device;
    a first transmitting unit that, based on the acquired first packet, transmits a third packet obtained by setting a destination of the first packet to a second device; and
    a second transmitting unit that, based on the acquired second packet, transmits a fourth packet obtained by setting a destination of the second packet to the second device, the fourth packet being transmitted upon elapse of a period from the transmission of the third packet and equal to a time interval between acquisition of the first packet and acquisition of the second packet.

13. A test method comprising:
    acquiring a first packet and a second packet sent to a first device;
    transmitting, based on the acquired first packet, a third packet obtained by setting a destination of the first packet to a second device; and
    transmitting, based on the acquired second packet, a fourth packet obtained by setting a destination of the second packet to the second device, the fourth packet being transmitted upon elapse of a period from the transmission of the third packet and equal to a time interval between acquisition of the first packet and acquisition of the second packet.

* * * * *